United States Patent
Lee

(10) Patent No.: US 11,644,848 B2
(45) Date of Patent: May 9, 2023

(54) APPARATUS FOR CONTROLLING PLATOONING AND A METHOD FOR PLANNING A PATH THEREOF

(71) Applicants: HYUNDAI MOTOR COMPANY, Seoul (KR); KIA MOTORS CORPORATION, Seoul (KR)

(72) Inventor: Chanhwa Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 359 days.

(21) Appl. No.: 16/922,797

(22) Filed: Jul. 7, 2020

(65) Prior Publication Data
US 2021/0181763 A1    Jun. 17, 2021

(30) Foreign Application Priority Data
Dec. 13, 2019    (KR) .................. 10-2019-0167035

(51) Int. Cl.
*G05D 1/02* (2020.01)
*G08G 1/00* (2006.01)
(Continued)

(52) U.S. Cl.
CPC ........... *G05D 1/0291* (2013.01); *B60W 30/14* (2013.01); *B60W 40/105* (2013.01);
(Continued)

(58) Field of Classification Search
CPC ...... G05D 1/0293; G05D 1/0295; G08G 1/22; B60W 30/16; B60W 30/165
See application file for complete search history.

(56) References Cited

U.S. PATENT DOCUMENTS

2013/0131925 A1*  5/2013  Isaji ................... B60K 31/0066
                                                                      701/41
2019/0392715 A1* 12/2019  Strauß ................. G06V 20/588
(Continued)

OTHER PUBLICATIONS

Stefan K. Gehrig et al., A Trajectory-Based Approach for the Lateral Control of Vehicle Following Systems, IEEE International Conference on Intelligent Vehicles; 1998; DOI: 10.1109/ICSMC.1998.726624; 6 pp.
(Continued)

*Primary Examiner* — Nadeem Odeh
(74) *Attorney, Agent, or Firm* — Lempia Summerfield Katz LLC

(57) ABSTRACT

An apparatus for controlling platooning and a method for planning a path are provided. The apparatus includes: a communication device to receive information on a preceding vehicle from the preceding vehicle through Vehicle to Vehicle (V2V) communication; a recognition device to obtain information on an $n^{th}$ following vehicle through a sensor mounted in a vehicle body; and a processor to generate third line information by matching first line information, which is in the information on the preceding vehicle, to second line information, which is in the information on the $n^{th}$ following vehicle, and to plan a platooning path by utilizing the third line information.

20 Claims, 15 Drawing Sheets

(51) Int. Cl.
*B60W 30/14* (2006.01)
*B60W 40/105* (2012.01)

(52) U.S. Cl.
CPC ............ *G05D 1/0293* (2013.01); *G08G 1/22* (2013.01); *B60W 2420/42* (2013.01); *B60W 2420/52* (2013.01); *B60W 2554/80* (2020.02)

(56) References Cited

U.S. PATENT DOCUMENTS

2020/0241563 A1* 7/2020 Van Der Knaap .... B60W 30/12
2021/0163004 A1* 6/2021 Wiberg ................ G05D 1/0295

OTHER PUBLICATIONS

W. Jansen, Lateral Path-Following Control for Automated Vehicle Platoons, Master of Science Thesis; Delft University of Technology; Jun. 30, 2016; 108 pp.

* cited by examiner

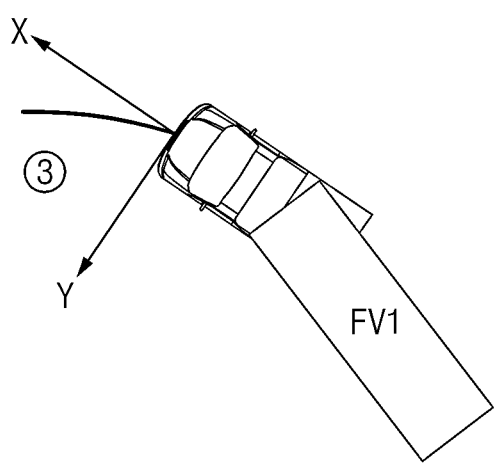
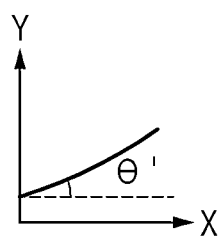
$$Y = \alpha_1'X + \alpha_0'$$
Fig.6

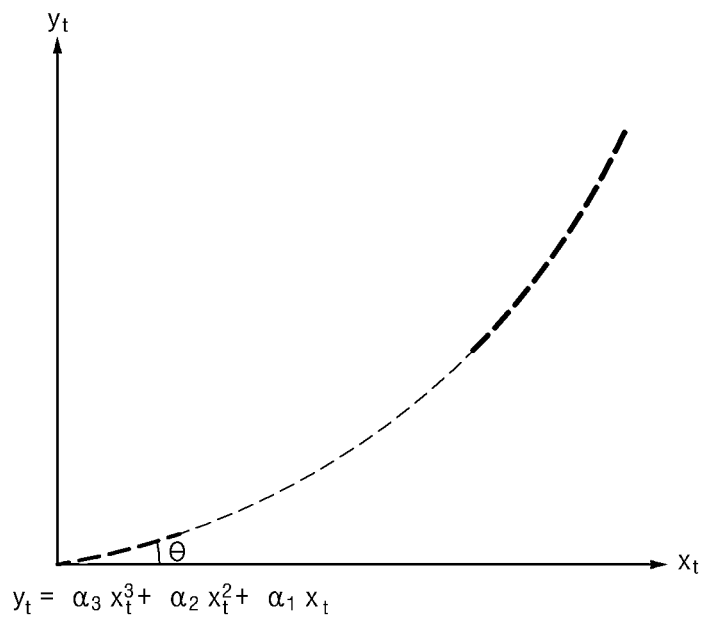
$y_t = \alpha_3 x_t^3 + \alpha_2 x_t^2 + \alpha_1 x_t$
ROTATION TRANSFORMATION
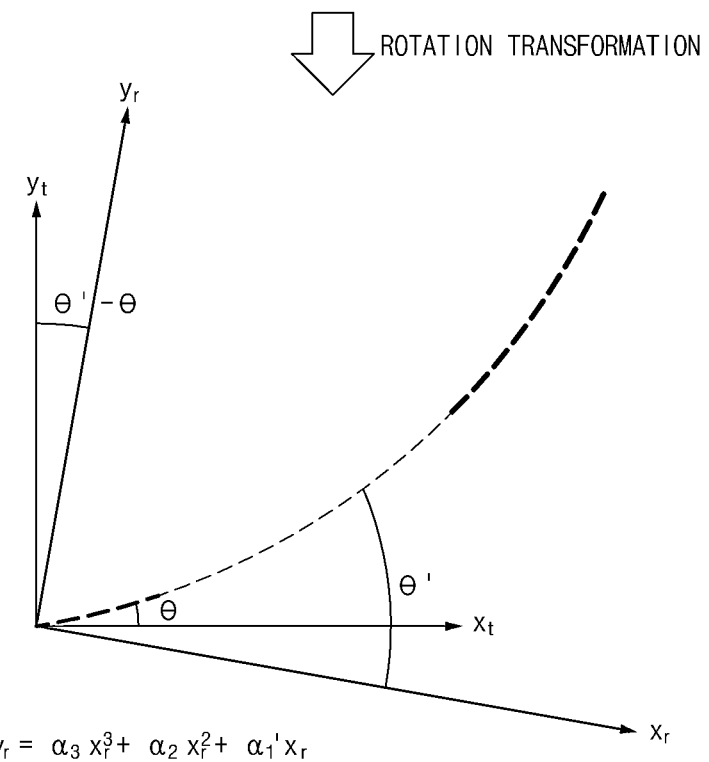
$y_r = \alpha_3 x_r^3 + \alpha_2 x_r^2 + \alpha_1' x_r$
Fig.8

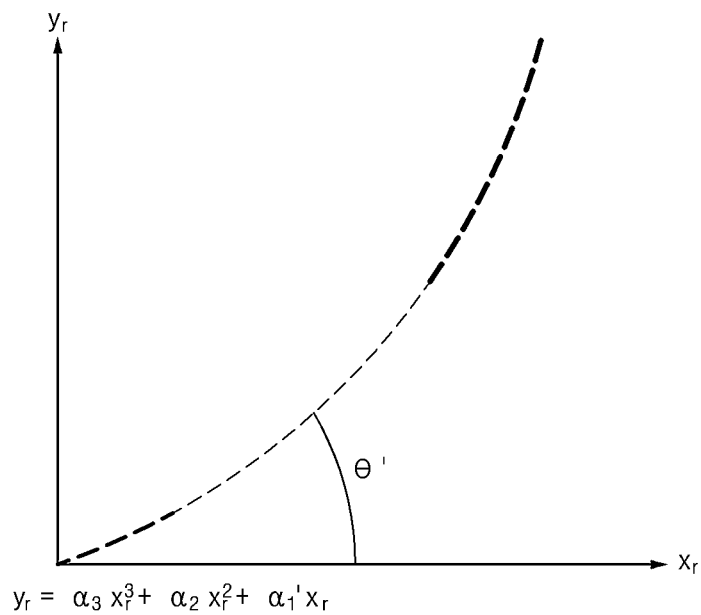
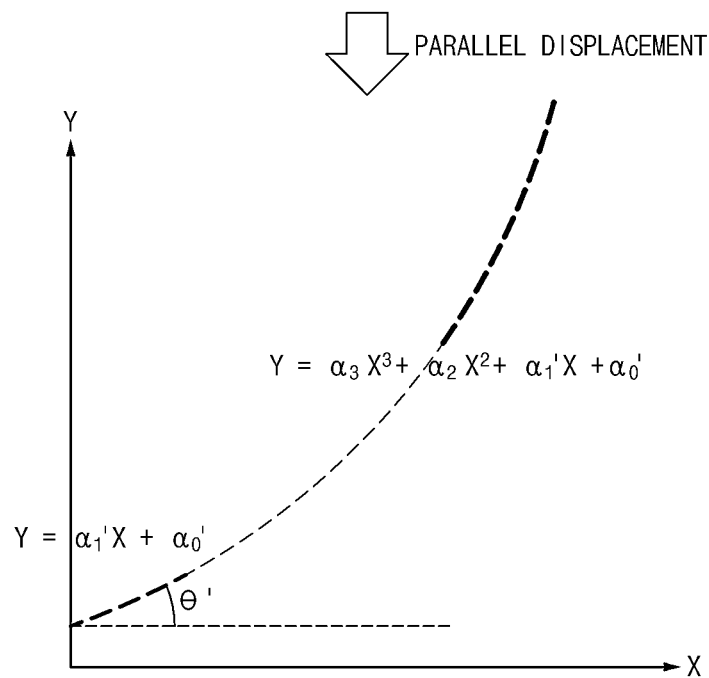
Fig.9

| T | $\alpha_3$ | $\alpha_2$ | $\alpha_1$ | $\alpha_0$ | PRESENCE OF OBJECT | OBJECT TYPE | OBJECT POSITION | v | — |
|---|---|---|---|---|---|---|---|---|---|
| 0.5 | 0.0000011 | 0.00008 | 0.11 | 0.53 | ○ | STREET LAMP | 1m | 20.2m/s | 15m |

| T | $\alpha_3$ | $\alpha_2$ | $\alpha_1$ | $\alpha_0$ | PRESENCE OF OBJECT | OBJECT TYPE | OBJECT POSITION | v | — |
|---|---|---|---|---|---|---|---|---|---|
| 0.52 | 0.000001 | 0.0001 | 0.1 | 0.5 | ○ | STREET LAMP | 0m | 19.8m/s | 15m |

| T | $\alpha_3$ | $\alpha_2$ | $\alpha_1$ | $\alpha_0$ | PRESENCE OF OBJECT | OBJECT TYPE | OBJECT POSITION | v | — |
|---|---|---|---|---|---|---|---|---|---|
| 0.54 | 0.0000009 | 0.00012 | 0.08 | 0.45 | × | — | — | 20.1m/s | 15m |

| T | $\alpha_3$ | $\alpha_2$ | $\alpha_1$ | $\alpha_0$ | PRESENCE OF OBJECT | OBJECT TYPE | OBJECT POSITION | v | — |
|---|---|---|---|---|---|---|---|---|---|
| 1.8 | 0.0000005 | 0.00002 | 0.03 | 0.1 | × | — | — | 20m/s | 15m |

Fig.12

| t | $\alpha_3'$ | $\alpha_2'$ | $\alpha_1'$ | $\alpha_0'$ | PRESENCE OF OBJECT | OBJECT TYPE | OBJECT POSITION | d |
|---|---|---|---|---|---|---|---|---|
| 1.8 | — | — | 0.2 | -0.3 | 0 | STREET LAMP | 0m | 10m |

Fig.13

[FIRST LINE INFORMATION]

| T | $\alpha_3$ | $\alpha_2$ | $\alpha_1$ | $\alpha_0$ |
|---|---|---|---|---|
| 0.52 | 0.000001 | 0.0001 | 0.1 | 0.5 |

[SECOND LINE INFORMATION]

| t | $\alpha'_3$ | $\alpha'_2$ | $\alpha'_1$ | $\alpha'_0$ |
|---|---|---|---|---|
| 1.8 | – | – | 0.2 | -0.3 |

[THIRD LINE INFORMATION]

| t | $\alpha'_3$ | $\alpha'_2$ | $\alpha'_1$ | $\alpha'_0$ |
|---|---|---|---|---|
| 1.8 | 0.000001 | 0.0001 | 0.2 | -0.3 |

Fig.14

APPARATUS FOR CONTROLLING PLATOONING AND A METHOD FOR PLANNING A PATH THEREOF

CROSS-REFERENCE TO RELATED APPLICATION

This application claims the benefit of priority to Korean Patent Application No. 10-2019-0167035, filed in the Korean Intellectual Property Office on Dec. 13, 2019, the entire contents of which are incorporated herein by reference.

TECHNICAL FIELD

The present disclosure relates to an apparatus for controlling platooning and a method for planning a path thereof.

BACKGROUND

Platooning refers to a technology, in which one leading vehicle (LV) and one or more following vehicles (FV) travel while forming a platoon (group). In platooning, the following vehicle travels while maintaining a specific distance to the front vehicle through a sensing technology using a radar and a camera. Such platooning is effective in fuel saving as air resistance is minimized due to the characteristics of driving at small inter-vehicular distances.

A vehicle performing platooning recognizes a line in front of the vehicle using a camera and follows the line using the recognized line information. However, since the distance to the front vehicle is short and the line is hidden by a trailer of the front vehicle in platooning, the line is recognized as being actually significantly short, so the precision of the line information is not high. To solve this problem, conventionally, although a manner of directly following the front vehicle or a manner of following a path of the front vehicle is used without utilizing the line information, the line may be invaded when such a manner is applied.

SUMMARY

The present disclosure has been made to solve the above-mentioned problems occurring in the prior art while advantages achieved by the prior art are maintained intact.

An aspect of the present disclosure provides an apparatus for controlling platooning, capable of correcting line information recognized by a vehicle by utilizing line information recognized by a leading vehicle and planning a platooning path using the corrected line information, and a method for planning a path thereof.

Another aspect of the present disclosure provides an apparatus for controlling platooning, capable of correcting an error resulting from the time difference from a front or preceding vehicle passing through the same position using information on a distance to a surrounding environment object, and a method for planning the path thereof.

The technical problems to be solved by the present inventive concept are not limited to the aforementioned problems, and any other technical problems not mentioned herein should be clearly understood from the following description by those having ordinary skill in the art to which the present disclosure pertains.

According to an aspect of the present disclosure, an apparatus for controlling platooning includes a communication device to receive information on a preceding vehicle from the preceding vehicle through Vehicle to Vehicle (V2V) communication. The apparatus further comprises a recognition device to obtain information on an $n^{th}$ following vehicle through a sensor mounted in a vehicle body. The apparatus further comprises a processor to generate third line information by matching first line information, which is contained in the information on the preceding vehicle, to second line information, which is contained in the information on the $n^{th}$ following vehicle, and to plan a platooning path by utilizing the third line information.

The information on the preceding vehicle includes the first line information, first surrounding object information, and vehicle information, which are obtained by the preceding vehicle.

The information on the $n^{th}$ following vehicle includes the second line information, second surrounding object information, and information on a position of the preceding vehicle, which are obtained through the recognition device.

The processor matches the first line information to the second line information based on a coordinate system of the $n^{th}$ following vehicle.

The processor corrects a difference between a time point at which the preceding vehicle passes through a surrounding object, and a time point at which the $n^{th}$ following vehicle passes through the surrounding object, when the surrounding object is recognized through the recognition device.

The processor calculates a maximum time error based on a vehicle length of the preceding vehicle and the information on the position of the preceding vehicle. The processor sets a detection range of the information on the preceding vehicle by using the maximum time error.

The processor detects the first surrounding object information, which is matched to the second surrounding object information, within the set detection range, and estimates a time point at which the first surrounding object information is obtained.

The processor calculates an error correction value based on the vehicle length of the preceding vehicle, the information on the position of the preceding vehicle, and a vehicle speed of the preceding vehicle.

The processor estimates a time point at which the preceding vehicle passes through the recognized surrounding object using an error correction value which is previously calculated, when failing to detect the first surrounding object information, which is matched to the second surrounding object information within the set detection range.

The processor corrects the second line information by utilizing the first line information, which is obtained at the estimated time point.

Another aspect of the present disclosure, a method for planning a path includes receiving information on a preceding vehicle from the preceding vehicle through V2V communication. The method further includes obtaining information on $n^{th}$ following vehicle through a sensor mounted in a vehicle body. The method further includes generating third line information by matching first line information, which is contained in the information on the preceding vehicle, to second line information, which is contained in the information on the $n^{th}$ following vehicle. The method further includes planning a platooning path by utilizing the third line information.

The receiving of the information on the preceding vehicle includes obtaining and storing, by the preceding vehicle, the information on the preceding vehicle including at least one of the first line information, first surrounding object information, or vehicle information by using at least one of a camera, a Light Detection And Ranging (Lidar), or a radar mounted in the preceding vehicle.

The obtaining of the information on the $n^{th}$ following vehicle includes obtaining and storing the information on the $n^{th}$ vehicle including at least one of the second line information, second surrounding object information, vehicle information, or information on a position of the preceding vehicle by using at least one of a camera, a Lidar, or a radar mounted in the nth following vehicle.

The generating of the third line information includes generating the third line information by matching the first line information to the second line information based on a coordinate system of the $n^{th}$ following vehicle.

The generating of the third line information includes correcting a difference between a time point at which the preceding vehicle passes through a surrounding object, and a time point at which the $n^{th}$ following vehicle passes through the surrounding object, when the surrounding object is recognized through the sensor.

The correcting of the difference between the time points includes: calculating a maximum time error based on a vehicle length of the preceding vehicle and the information on the position of the preceding vehicle; setting a detection range of the information on the preceding vehicle by using the maximum time error; detecting first surrounding object information, which is matched to the second surrounding object information, within the set detection range; selecting the first line information matched to the first surrounding object information; and correcting the second line information by utilizing the selected first line information.

The setting of the detection range includes setting the detection range by using the difference between the time points at which the preceding vehicle and the $n^{th}$ following vehicle pass through the recognized surrounding object, and the maximum time error.

The selecting of the first line information includes estimating a time point at which the first surrounding object information is obtained; and selecting line information at the estimated time point as the first line information.

The selecting of the first line information includes calculating an error correction value based on the vehicle length of the preceding vehicle, the information on the position of the preceding vehicle, and a vehicle speed of the preceding vehicle.

The method further includes estimating a time point at which the preceding vehicle passes through the recognized surrounding object using an error correction value which is previously calculated, when failing to detect the first surrounding object information, which is matched to the second surrounding object information, within the detection range; and selecting line information obtained at an estimated time point (T) as the first line information.

BRIEF DESCRIPTION OF THE DRAWINGS

The above and other objects, features and advantages of the present disclosure should be more apparent from the following detailed description taken in conjunction with the accompanying drawings:

FIGS. 6-9 are views illustrating a line matching method when generating information on a third line illustrated in FIG. 4;

FIGS. 11-14 are view illustrating that line information is planned through the correction of the time error, according to an embodiment of the present disclosure.

DETAILED DESCRIPTION

Figure 1:
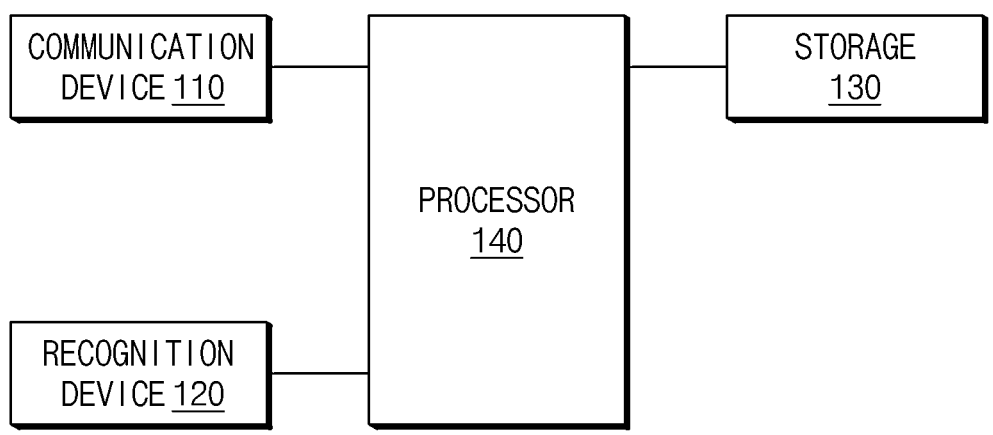
FIG. 1 is a block diagram illustrating an apparatus for controlling platooning, according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined in the present application. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

In the present specification, a vehicle in the frontmost of the line of vehicle platooning is referred to a leading vehicle (LV), a vehicle following the leading vehicle (LV) is referred to a following vehicle (FV), a vehicle right before a vehicle is referred to a preceding vehicle, and the leading vehicle (LV) and the following vehicle (FV) are collectively referred to platooning vehicles. Further, in the coordinate system of a vehicle, the center of vehicle's front bumper is referred to an origin point, the lengthwise direction of the vehicle is referred to as an X axis, and the widthwise direction of the vehicle is referred to as a Y axis.

Figure 2:
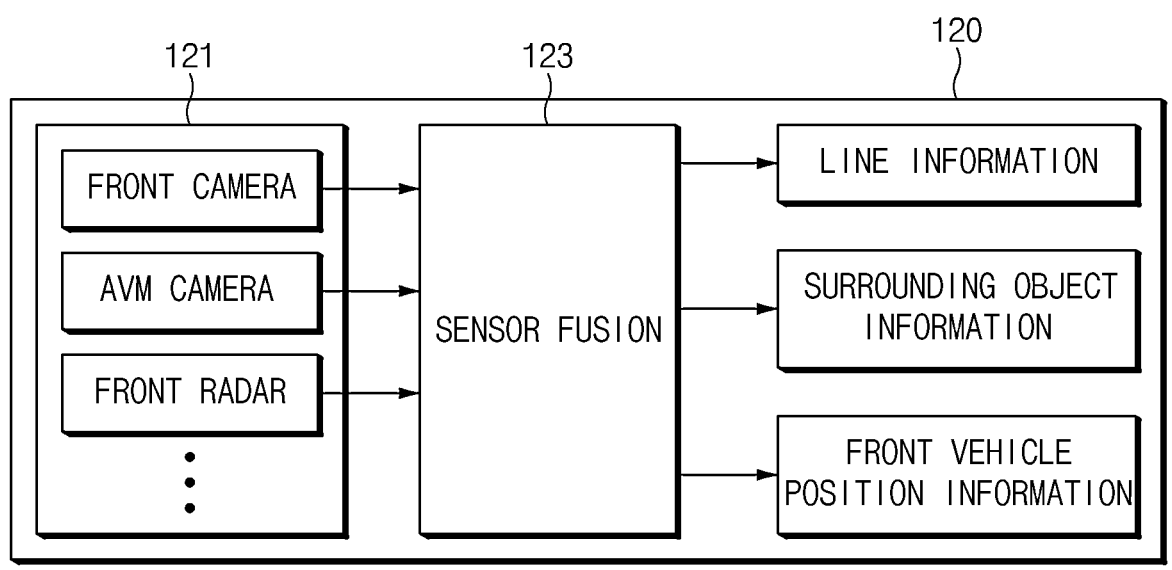
FIG. 2 is a block diagram illustrating a recognition device illustrated in FIG. 1.
Figure 3:
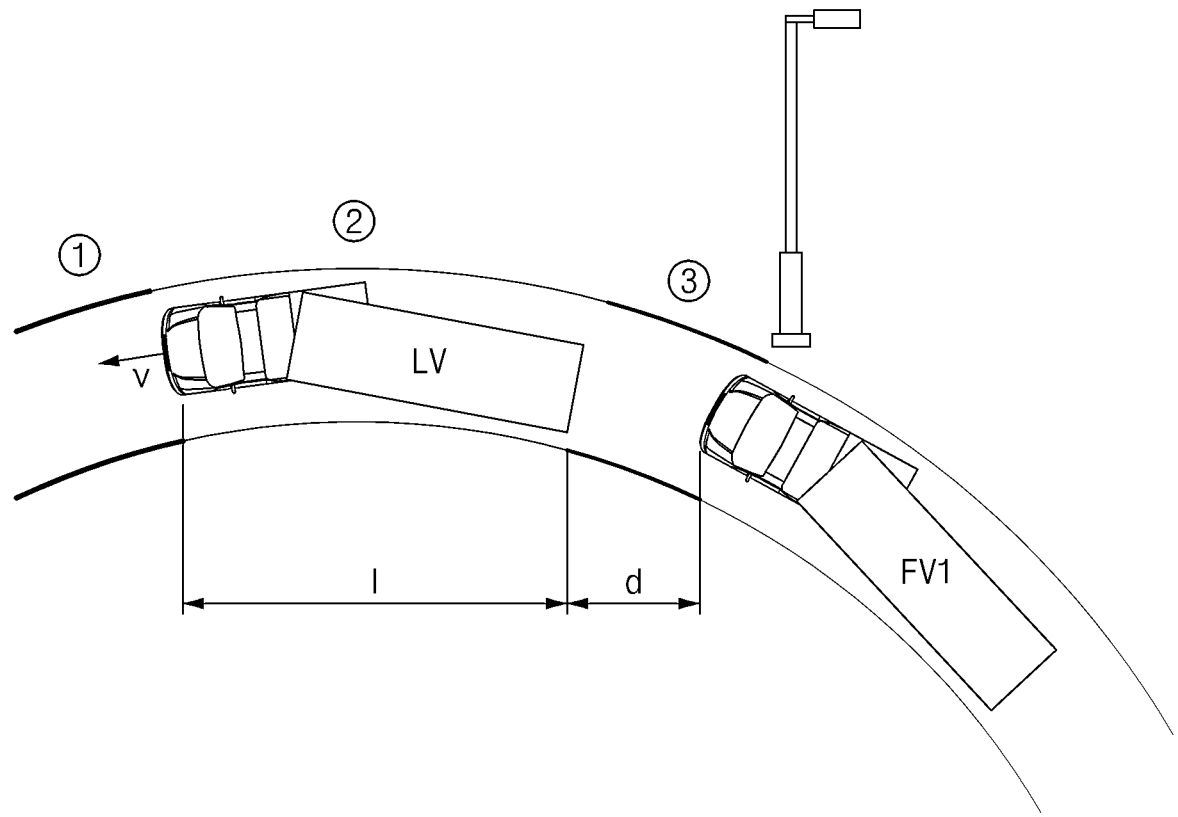
FIG. 3 is a view illustrating line recognition of a following vehicle in relation to the present disclosure.

FIG. 1 is a block diagram illustrating an apparatus for controlling platooning, according to an embodiment of the present disclosure, FIG. 2 is a block diagram illustrating a recognition device illustrated in FIG. 1, and FIG. 3 is a view illustrating line recognition of a following vehicle in relation to the present disclosure. The apparatus 100 for controlling platooning is mounted in a platooning vehicle to plan a path and to perform 'directions' along the planned path.

Referring to FIG. 1, the apparatus 100 for controlling platooning includes a communication device 110, a recognition device 120, a storage 130, and a processor 140.

The communication device 110 performs communication with another vehicle in the platooning vehicle through vehicle to vehicle (V2V) communication. The communication device 110 receives the information (data) transmitted from the preceding vehicle through V2V communication. In addition, the communication device 110 transmits information to the following vehicle through the V2V communication. Although the present embodiment describes that the communication device 110 employs the V2V communication, the present disclosure is not limited thereto. For example, the communication device 100 may employ Bluetooth, near field communication (NFC), radio frequency identification (RFID), wireless LAN (WLAN; Wi-Fi) and/or mobile communication.

The recognition device 120 recognizes a front line and a surrounding environment through sensors mounted in the vehicle. Referring to FIG. 2, the recognition device 120 includes a sensing device 121 and a sensor fusion device 123. The sensing device 121 obtains front data through a front camera, an Around View Monitoring (AVM) camera, a Light Detection and Ranging (LiDAR) and/or a radar. The sensor fusion module 123 performs fusion with respect to front data obtained through the sensing module 121 to output line information, surrounding object information, vehicle information, and/or information on the position of a preceding vehicle. The line information includes a curvature rate $\alpha_3(t)$, a curvature $\alpha_2(t)$, a heading angle $\alpha_1(t)$, and an offset $\alpha_0(t)$ of a line. In this embodiment, the heading angle is a rotation angle (in other words, an angle formed between the X axis and the lane) of the line based on the X axis in the vehicle coordinate system, and the offset is a distance between the center of the vehicle in a Y-axis direction and the center (the center between lines) of the lane on which the vehicle travels. The surrounding object information includes the presence of an object, the type (e.g., a street lamp or a road sign of the object), and the position (the longitudinal distance between the vehicle and the object) of the object. The vehicle information includes a vehicle speed (v) and a vehicle length (l). In this embodiment, the vehicle speed (v) may be obtained through a speedometer or a speed sensor mounted on the vehicle. The vehicle length (l) refers to the distance between a front end portion and a rear end portion of the vehicle as illustrated in FIG. 3. The vehicle length (l) may be calculated by adding the lengths of a tractor and a trailer to each other based on specification information which is previously stored in the storage 130. The information on the position of the preceding vehicle includes the distance (d) between the vehicle and the preceding vehicle. The recognition device 120 may include a memory (not illustrated) to store software programmed such that the recognition device 120 performs a specific operation and a processor (not illustrated) to execute software stored in the memory (not illustrated).

The storage 130 may store a program for the operation of the processor 140 and may store input data and/or output data of the processor 140. The storage 130 may store a line recognition algorithm, a path planning algorithm, a following driving control algorithm, and/or an autonomous driving control algorithm. The storage 130 may store map information and/or various setting information. The storage 130 may be implemented with at least one of storage media (recording media) such as a flash memory, a hard disk, a Security Digital (SD) card, a Random Access Memory, a Static Random Access Memory, a Read Only Memory (ROM), a Programmable Read Only Memory, an Electrically Erasable and Programmable ROM (EEPROM), an Erasable and Programmable ROM (EPROM), a register, a buffer, a detachable disk, and a web-storage.

The processor 140 controls the overall operation of the apparatus 100 for controlling platooning. The processor 140 may include at least one of an Application Specific Integrated Circuit (ASIC), a Digital Signal Processor (DSP), a Programmable Logic Device (PLD), Field Programmable Gate Arrays (FPGAs), a Central Processing Unit (CPU), a microcontroller, and a microprocessor.

The operation of the processor 140 may be depending on the position of a vehicle equipped with the apparatus 100 for controlling platooning in the platooning vehicles, in other words, depending on whether the vehicle is the leading vehicle (LV) or the following vehicle (FV). Hereinafter, the operation of the processor 140 is described by distinguishing between the cases that the vehicle is the leading vehicle (LV) and the following vehicle (FV).

First, the operation of the processor 140 is described when the vehicle equipped with the apparatus 100 for controlling platooning is the leading vehicle (LV).

The processor 140 obtains, at specific time intervals, line information (first line information), surrounding object information, and vehicle information through the recognition device 120 and stores the information in the storage 130. The processor 140 may generate the information, which is obtained at the specific time intervals, in the form shown in table 1 and may store the information.

TABLE 1

| t | $\alpha_3(t)$ | $\alpha_2(t)$ | $\alpha_1(t)$ | $\alpha_0(t)$ | Presence of object | Type of object | Position of object | v | l |
|---|---|---|---|---|---|---|---|---|---|
| 0.52 s | 0.000001 | 0.0001 | 0.1 | 0.5 | Presence | Street lamp | 0 m | 19.8 m/s | 15 m |

The processor 140 transmits the line information, the surrounding object information, or the vehicle information, which is stored in the storage 130, through the communication device 110. The processor 140 may transmit relevant information in a specific cycle or may detect (extract) information, which is requested by the following vehicle (FV) and is within a detection range, from the storage 130. The following description is made regarding the operation of the processor 140 when the vehicle equipped with the apparatus 100 for controlling platooning is the following vehicle (FV).

The processor 140 receives information, which is transmitted by the preceding vehicle (LV or FVn−1), through the communication device 110 and stores the information in the storage 130. In other words, the processor 140 stores, in the storage 130, information on the preceding vehicle which is provided at each time by the preceding vehicle. When the preceding vehicle is the leading vehicle (LV) (in other words, when the subject vehicle is the first following vehicle (FV1) which is at the first position of the following vehicles), the processor 140 receives line information (first line information), surrounding object information, and vehicle information, which is transmitted by the leading vehicle (LV). In another embodiment, the processor 140 receives line information (first line information), surrounding object information, vehicle information, and/or information on a position of the preceding vehicle, which is transmitted from the preceding vehicle (FVn−1), when the preceding vehicle is the (n−1)$^{th}$ following vehicle (FVn−1) (n≥2), in other words, when the subject vehicle is the n$^{th}$ following vehicle (FVn) which is at an n$^{th}$ position of the following vehicles. In this embodiment, the first line information of the n$^{th}$ following vehicle (FVn) is calculated using line information received by the (n−1)$^{th}$ following vehicle (FVn−1) from its preceding vehicle (FVn−2) and line information recognized through the recognition device 120 of the (n−1)$^{th}$ following vehicle (FVn−1).

In addition, the processor 140 obtains line information (second line information), surrounding object information, and information on the position of the preceding vehicle through the recognition device 120 at a specific time interval, and stores the information in the storage 130. In this embodiment, the processor 140 may obtain only the line information of a third section ③, because the processor 140 may not obtain line information of the first section ①; and the second section K of FIG. 3. In this embodiment, the first section ① is a line section having a specific distance to a front portion of the preceding vehicle, the second section ② is a line section having a vehicle length (l) of the preceding vehicle, in other words, a line section between the front end and the rear end of the preceding vehicle, and the third section ③ is a line section between the rear end of the preceding vehicle and the front end of the host vehicle. The following vehicle (FVn) may recognize only the line of the third section ③ because the lines of the first section ① and the second section ② are hidden by the vehicle body of the preceding vehicle (LV or FVn−1). The processor 140 may measure the distance (d) between the vehicle and the preceding vehicle, in other words, the information on the position of the preceding vehicle using a distance measuring sensor such as a front radar. The processor 140 may generate and store information obtained at specific time intervals in the form of table 2. In other words, the processor 140 may store information on the following vehicle (FVn) at each time.

TABLE 2

| t | α₃(t) | α₃(t) | α₃(t) | α₃(t) | Presence of object | Type of object | Object position | d |
|---|---|---|---|---|---|---|---|---|
| 1.8 s | — | — | 0.2 | −0.3 | Presence | Street lamp | 0 m | 10 m |

The processor 140 obtains line information (second line information) through the recognition device 120 at a time point (t), and detects, from the storage 130, line information (first line information), which is obtained at a time point $$t - \frac{l+d}{v},$$

of line information provided from the preceding vehicle (LV or FVn−1). The processor 140 generates the final line information (the third line information) based on a vehicle (FVn) coordinate system by matching the first line information to the second line information. In this embodiment, the second line information is based on a vehicle (FVn) coordinate system, and the first line information is based on a preceding vehicle (LV or FVn−1) coordinate system. The processor 140 may store the surrounding object information and the vehicle information, which are obtained through the recognition device 120 mounted in the vehicle body, together with the third line information, in the form of table 1, and may transmit the information to the following vehicle (FVn+1). The processor 140 may perform time error correction when generating the third line information by correcting the first line information based on the second line information. The length of lines of the second section ② and the third section ③ is different from the sum of the vehicle length (l) and the distance (d) between the vehicle and the preceding vehicle, and the speed of the preceding vehicle (LV or FVn−1) is not uniform during travelling in the second section and the third section. Accordingly, an error occurs in the time difference $$\frac{l+d}{v}$$

between time points when the preceding vehicle (LV or FVn−1) and the n$^{th}$ following vehicle (FVn) pass through the same position (in detail, an error occurs in the difference between a time points at which the preceding vehicle of the vehicle and a time point at which the vehicle pass through the same position). Since the line information recognized by the preceding vehicle LV is sequentially transmitted to the following vehicle, errors are more accumulated in a further rear vehicle of the platooning vehicles. Accordingly, a vehicle at the rear of the platooning vehicles has greater errors. Accordingly, to correct the errors, a time error should be corrected.

The following description is made in detail regarding the procedure of correcting the error which is made in the difference between time points when the preceding vehicle of the vehicle and the vehicle pass through the same position.

First, the processor 140 calculates the maximum time error Δ by using the following Equation 1.

$$\Delta = \frac{l+d+\Delta_l+\Delta_d}{v_{min}} - \frac{l+d-\Delta_l-\Delta_d}{v_{max}} \quad \text{Equation 1}$$

In this embodiment, $\Delta_l$, which is the maximum difference between the vehicle length l of the preceding vehicle and the line length of the second section, is preset based on the experimental value or a lookup table having errors preset or defined based on the vehicle information (e.g., the length between the tractor and the trailer and the angle between the tractor and the trailer) and information on a road curvature. In addition, $\Delta_d$ denotes the maximum error of the distance (d) to the preceding vehicle, which is recognized by the vehicle and is a sensor error value preset based on an experimental value. In addition, $v_{max}$ and $v_{min}$ denote the maximum speed and the minimum speed, respectively, while the preceding vehicle is travelling with the length of l+d+$\Delta_l$+$\Delta_d$.

Next, the processor 140 obtains surrounding object information and sets a range (hereinafter, detection range) for detecting information on the preceding vehicle using the maximum time error, which is calculated as described above, when a surrounding object (fixing object) such as a road sign or a street lamp is recognized. In other words, the processor 140 sets, as the detection range, a range from a $$t - \frac{l+d}{v} - \Delta$$

second to a $$t - \frac{l+d}{v} + \Delta$$

second. The processor 140 detects (extracts) information on the preceding vehicle, which is in the detection range, from the storage 130. The processor 140 detects surrounding object information, which is matched to the obtained surrounding object information, of the preceding vehicle in the detected preceding vehicle information. The processor selects the preceding vehicle information matched to the found surrounding object information of the preceding vehicle. The processor 140 calculates an error correction value δ by applying a time point (T), at which the selected preceding vehicle information is obtained, to the following Equation 2. The processor 140 stores the calculated error correction value to the storage 130.

$$t - \frac{l+d}{v} + \delta = T \qquad \text{Equation 2}$$

The processor 140 generates the final line information (the third line information) using line information at the time point $$t - \frac{l+d}{v} + \delta$$

in which the calculated error correction value is reflected.

Meanwhile, the processor 140 generates information on the third line using line information at the time point $$t - \frac{l+d}{v} + \delta$$

using the error correction vale δ, which is previously calculated, when the surrounding object information, which is matched to the obtained surrounding object information, of the preceding vehicle is not found in the detected preceding vehicle information.

Figure 4:
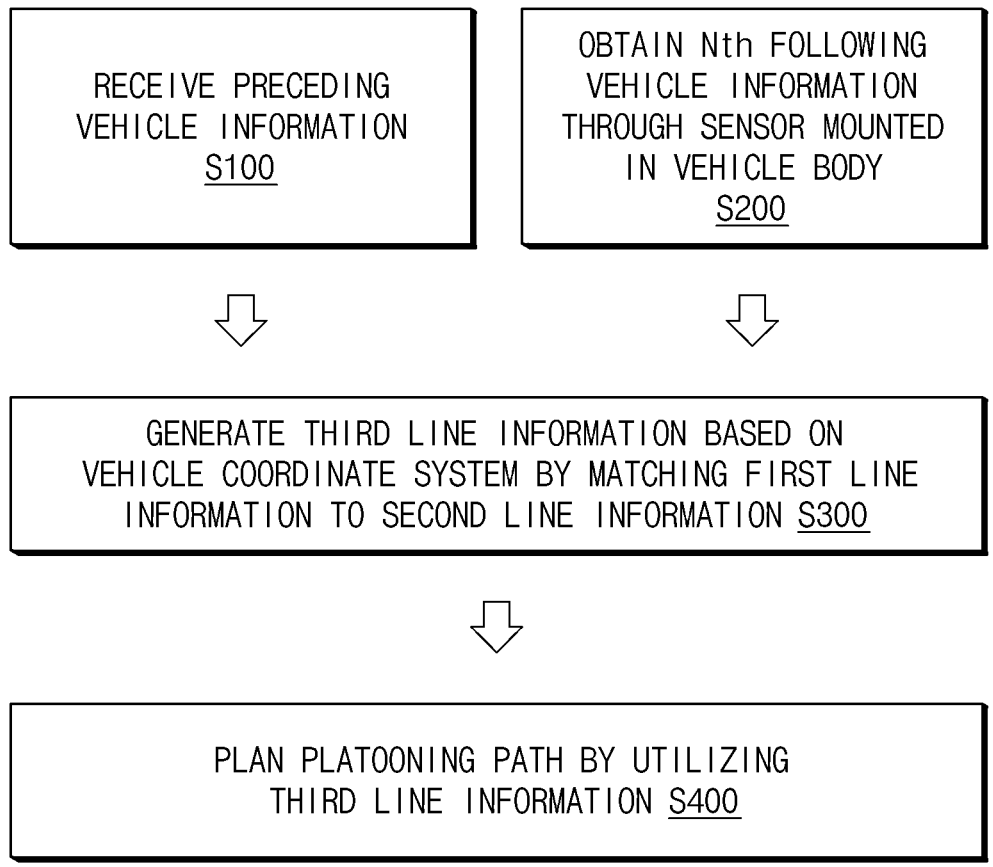
FIG. 4 is a flowchart illustrating a method for planning a path of the apparatus for controlling platooning, according to an embodiment of the present disclosure.
Figure 5:
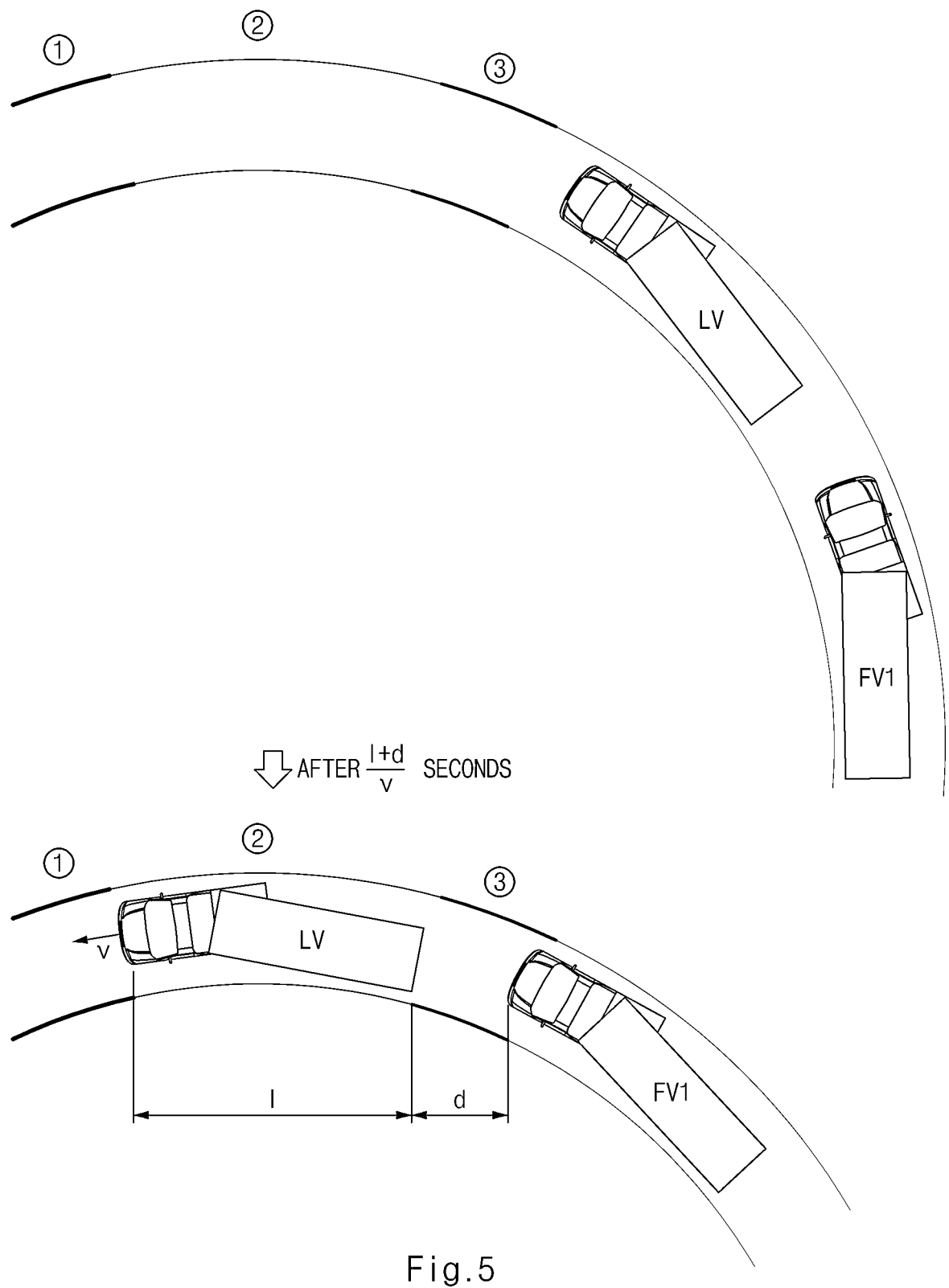
FIG. 5 is a view illustrating line recognition in relation to the present disclosure.

FIG. 4 is a flowchart illustrating a method for planning the path of the apparatus 100 for controlling platooning, according to an embodiment of the present disclosure, and FIG. 5 is a view illustrating line recognition in relation to the present disclosure.

Referring to FIG. 4, the processor 140 of the $n^{th}$ following vehicle (FVn; n≥1) receives preceding vehicle information transmitted from the preceding vehicle (LV or FVn−1) through the communication device 110 (S100). The preceding vehicle information may include line information, surrounding object information, and vehicle information of the preceding vehicle (LV or FVn−1). According to the present embodiment, the first line information of preceding vehicle is collectively referred to first line information recognized by the recognition device 120 of the leading vehicle (LV) when the preceding vehicle is the leading vehicle (LV). The third line information calculated by the processor 140 of the $(n-1)^{th}$ following vehicle is referred to the first line information of the preceding vehicle in terms of an $n^{th}$ following vehicle, when the preceding vehicle is the $(n-1)^{th}$ following vehicle. The processor 140 stores the received preceding vehicle information in the storage 130.

The processor 140 receives the preceding vehicle information and obtains the $n^{th}$ following vehicle information through the recognition device 120 (S200). The recognition device 120 obtains $n^{th}$ following vehicle information through a sensor (sensors) such as a front camera, an AVM (around view monitoring) camera, and/or a front radar mounted on the vehicle body. The $n^{th}$ following vehicle information includes line information (hereinafter, referred to as second line information), surrounding object information, and information on the position of the preceding vehicle position. For example, the first following vehicle (FV1) recognizes the line of the third section except for lines of the first section ① and the second section ② hidden by the leading vehicle (LV) and obtains the line information of the recognized third section ③, at the time point (t).

The processor 140 generates (calculates) third line information based on an $n^{th}$ following vehicle coordinate system by matching the first line information, which is present in the preceding vehicle information, to second line information which is present in the $n^{th}$ following vehicle information (S300). The processor 140 calculates the time difference $$\frac{l+d}{v}$$

between time points when the preceding vehicle (LV or FVn−1) and the $n^{th}$ following vehicle (FVn) pass through the starting point of the third section ③. The processor 140 detects the first line information in the preceding vehicle information, which is obtained at the time point $$t - \frac{l+d}{v} + \delta,$$

of the preceding vehicle information stored in the storage 130, based on the time point when the $n^{th}$ following vehicle (FVn) passes through the starting point of the third section ③, the calculated time difference $$\frac{l+d}{v},$$

and the calculated error correction value (δ). The processor 140 calculates third line information by matching the found first line information to the second line information. The processor 140 transmits the third line information, which is generated through the communication device 110, to an $(n+1)^{th}$ following vehicle (FVn+1). In this embodiment, the processor 140 transmits the surrounding object information and the vehicle information of the obtained $n^{th}$ following vehicle together with the third line information.

The processor 140 generates the platooning path by utilizing the generated third line information (S400). In other words, the processor 140 generates the platooning path such that the $n^{th}$ following vehicle travels along a line that the $n^{th}$ following vehicle draws based on the third line information.

FIGS. 6-9 are views illustrating the method for matching a line when the third line information illustrated in FIG. 4 is generated. The following description of the present embodiment describes that the line information received from the leading vehicle (LV) is matched to line information recognized by the first following vehicle (FV1). In this embodiment, the line refers to a central line between both lines indicating a road.

The first following vehicle (FV1) generates a second line by obtaining line information of the third section ③ using sensors mounted in the vehicle body, at the time point (t). The first following vehicle (FV1) obtains the heading angle and the offset of the line of the third section ③ based on the sensor data measured by the sensors and the second line information. The first following vehicle (FV1) generates a second line $$Y(=\alpha'_1 X + \alpha'_0)$$

based on first following vehicle coordinate system (X, Y) as illustrated in FIG. 6 using the heading angle $\alpha_1'$ and the offset $\alpha_0'$ of the line of the third section ③.

Figure 7:
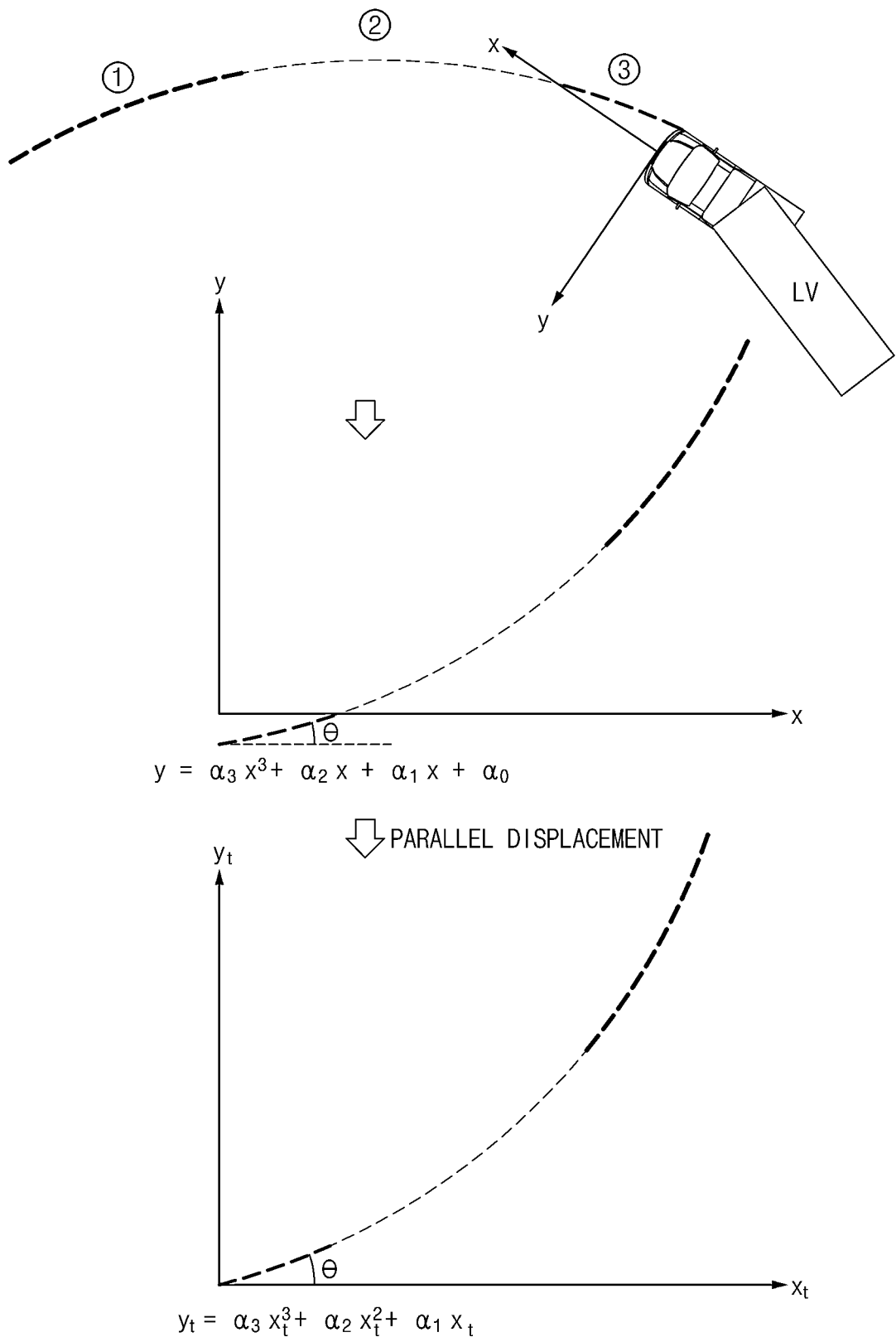

In addition, the first following vehicle (FV1) generates the first line by using line information obtained at the time point $$t - \frac{l+d}{v} + \delta,$$

in other words, the curvature rate $\alpha_3$, a curvature $\alpha_2$, a heading angle $\alpha_1$, and an offset $\alpha_0$ of the lines of the first section to third section (① to ③). The first line $$y(=\alpha_3 x^3 + \alpha_2 x^2 + \alpha_1 x + \alpha_0)$$

is generated based on a leading vehicle (LV) coordinate system (x, y) as illustrated in FIG. 7. The first following vehicle (FV1) obtains a new coordinate system $(x_t, y_t)$ by performing parallel-displacement with respect to the leading vehicle coordinate system (x, y) such that the first line $y=\alpha_3 x^3+\alpha_2 x^2+\alpha_1 x+\alpha_0$ passes through the origin point of the coordinate system. In other words, the first line may be expressed through $y_t=\alpha_3 x_t^3+\alpha_2 x_t^2+\alpha_1 x_t$.

The first following vehicle (FV1) rotation-transforms the first line subject to the parallel displacement. The first following vehicle (FV1) calculates the rotation transformation angle $\theta'-\theta$ using an angle $\theta'=\arctan \alpha_1'$ formed by the second line based on an X axis of the first following vehicle coordinate system and an angle $\theta=\arctan \alpha_1$ formed by the first line based on the X axis of the leading vehicle coordinate system. The first following vehicle (FV1) obtains a new coordinate system $(x_r, y_r)$ by rotating a coordinate system $(x_t, y_t)$ by $-(\theta'-\theta)$ based on the rotation transformation angle calculated as in illustrated in FIG. 8. In this embodiment, the first following vehicle (FV1) performs rotation-transformation of the first line subject to the parallel-displacement using following Equation 3.

$$\begin{bmatrix} x_r \\ y_r \end{bmatrix} = \begin{bmatrix} \cos(\theta'-\theta) & -\sin(\theta'-\theta) \\ \sin(\theta'-\theta) & \cos(\theta'-\theta) \end{bmatrix} \begin{bmatrix} x_t \\ y_t \end{bmatrix} \quad \text{Equation 3}$$

The second line rotation-transformed may be expressed as in Equation 4.

$$-\sin(\theta'-\theta)x_r+\cos(\theta'-\theta)y_r=\alpha_3(\cos(\theta'-\theta)x_r+\sin(\theta'-\theta)y_r)^3+\alpha_2(\cos(\theta'-\theta)x_r+\sin(\theta'-\theta)y_r)^2+\alpha_1(\cos(\theta'-\theta)x_r+\sin(\theta'-\theta)y_r) \quad \text{Equation 4}$$

Approximately, the relation equation of $x_r$ and $y_r$, which are rotation-transformed, is induced. In this embodiment, since $\alpha_3$, $\alpha_2 \ll \alpha_1$, $\alpha_0$ and $\theta'-\theta \ll 1$ are satisfied, the relation equation of $x_r$ and $y_r$ is as in Equation 5.

$$y_r=\alpha_3 x_r^3+\alpha_2 x_r^2+\alpha_1' x_r \quad \text{Equation 5}$$

The first following vehicle (FV1) parallel-displaces a coordinate system $(x_r, y_r)$ to be matched to a coordinate system (X, Y) such that the line $y_r=\alpha_3 x_r^3+\alpha_2 x_r^2+\alpha_1' x_r$, which is approximately calculated, passes through coordinates $(0, \alpha_0')$ based on the coordinate system (X, Y) of the first following vehicle. In other words, as illustrated in FIG. 9, the first line is matched with the second line to generate the third line.

Figure 10:
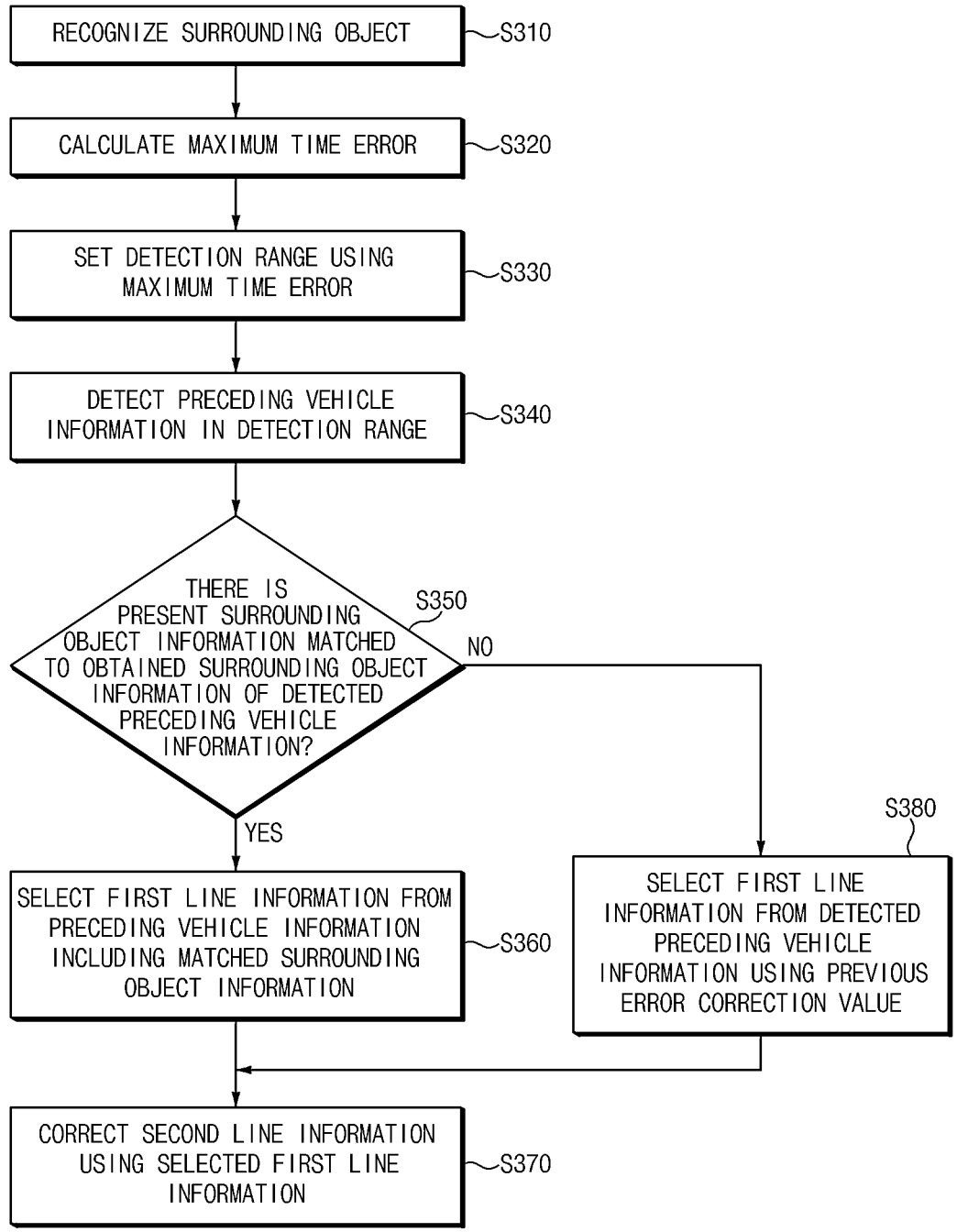
FIG. 10 is a flowchart illustrating a method for correcting a time error when generating information on a third line illustrated in FIG. 4.
Figure 11:
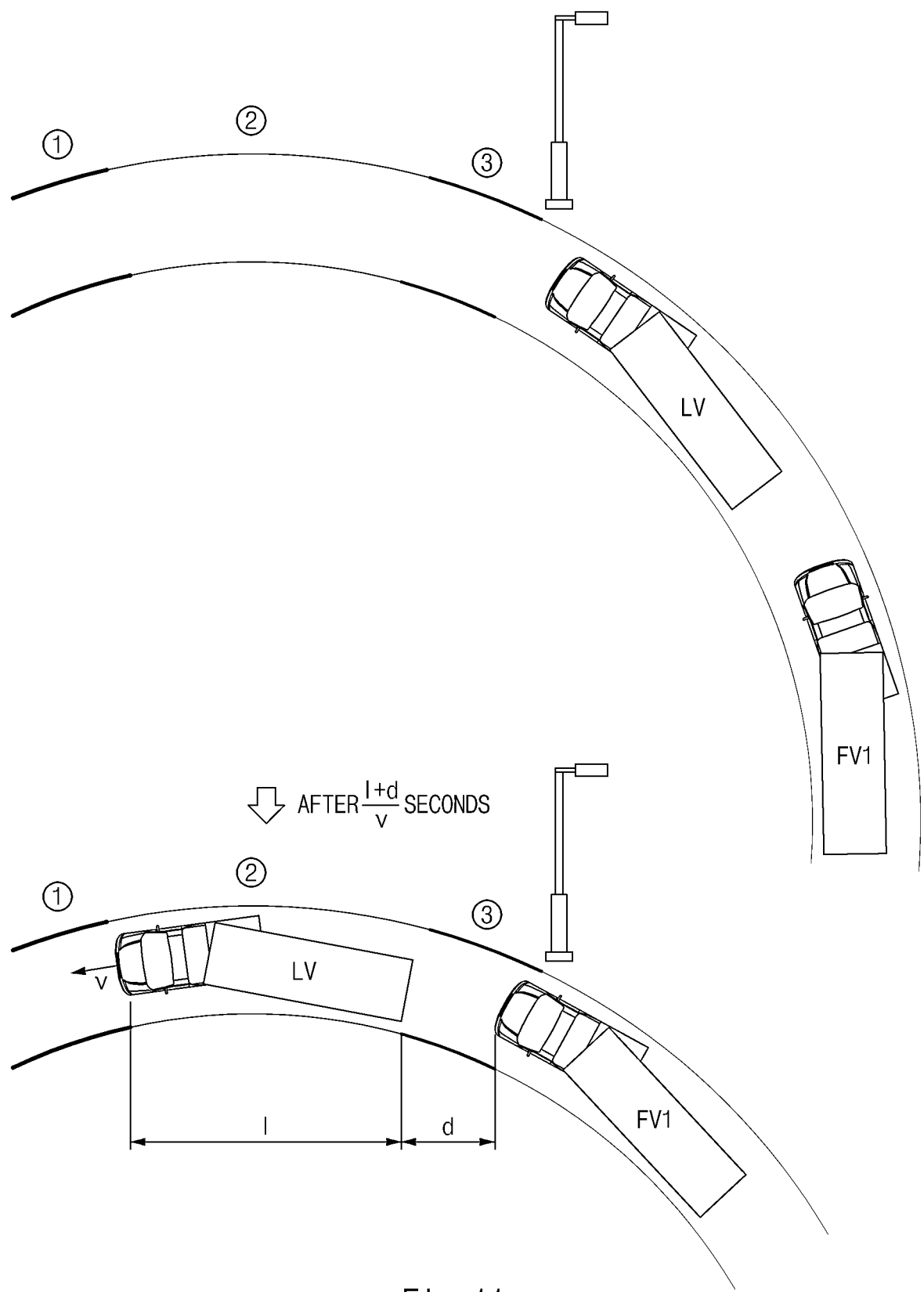

FIG. 10 is a flowchart illustrating a method for correcting a time error when the third line information illustrated in FIG. 4 is generated, and FIGS. 11-14 are views illustrating line information generated by correcting a time error, according to an embodiment of the present disclosure. The present embodiment describes that the leading vehicle (LV) and the first following vehicle (FV1) pass through a surrounding object, in other words, a street lamp, in the third section ③ as illustrated in FIG. 11 for the convenience of explanation.

The processor 140 of the first following vehicle (FV1) determines the recognition of the surrounding object by the recognition device 120 in S200 (S310). In this embodiment, the surrounding object, which serves as a reference for determining a time point to correct the time error, may be a facility, such as a traffic light, a street lamp, or a road sign board, which is fixedly placed on a roadside.

The processor 140 calculates the maximum time error by using the vehicle length (l), which is received from the leading vehicle (LV), of the leading vehicle (LV) and the distance (d), which is obtained through the recognition device 120, to the leading vehicle (LV) (S320). For example, when the vehicle length (l) of the leading vehicle (LV) is 15 m, the maximum error $\Delta_l$ between the vehicle length l and the line length of the second section ② is 0.5 m. When the vehicle distance to the leading vehicle (LV) is 10 m, the maximum error $\Delta_d$ of the vehicle distance is 0.2 m. When the maximum vehicle speed $v_{max}$ and the minimum vehicle speed $v_{min}$ are 20.5 m/s and 19.5 m/s, respectively, while the leading vehicle (LV) travels with the length of $l+d+\Delta_l+\Delta_d$, the maximum time error $\Delta$ is calculated through Equation 1 to 0.13 seconds.

The processor 140 sets the detection range by using the maximum time error $\Delta$ (S330). For example, when the time point (t) at which the first following vehicle FV1 recognizes the surrounding object is 1.8 seconds, the vehicle speed of the leading vehicle (LV) is 20 m/s, and the maximum time error $\Delta$ is 0.13 seconds, the processor 140 calculates the minimum time to 0.42 seconds and the maximum time to 0.68 seconds, the range between the minimum time of 0.42 seconds and the maximum time of 0.68 seconds is set as the detection range.

The processor 140 detects the preceding vehicle information within the detection range (S340). The processor 140 compares the surrounding object information of the preceding vehicle information within the detection range with the surrounding object information obtained through the recognition device 120. For example, the processor 140 may detect the preceding vehicle information, which indicates that the surrounding is the street lamp, and the distance to the surrounding object is 0 m. The preceding vehicle information is stored in the storage 130 and is within the detection range between 0.42 seconds and 0.68 seconds. This detection is performed when the surrounding object obtained through the recognition device 120 is the street lamp, and the distance to the surrounding object is 0 m. In other words, the preceding vehicle (LV) detects a time point at which the street lamp recognized by the first following vehicle (FV1) is recognized at the same distance.

The processor 140 determines whether surrounding object information of the detected preceding vehicle information is matched to the obtained surrounding object information (S350).

The processor 140 selects first line information, which includes relevant surrounding object information, from the preceding vehicle information, when the detected preceding vehicle information has surrounding object information matched to the obtained surrounding object information (S360). For example, when the preceding vehicle information stored in the storage 130 is shown in FIG. 12, the processor 140 extracts line information, which is obtained by the leading vehicle (LV) at 0.52 seconds, since the time point (T), at which the leading vehicle (LV) recognizes the street lamp, which is recognized by the first following vehicle (FV1), at the distance of 0 m, is 0.52 seconds. When the vehicle length of the leading vehicle (LV) is 'l', the vehicle distance to the leading vehicle (LV) is 'd', and the vehicle speed of the leading vehicle (LV) at 1.8 seconds is 20 m/s, the processor 140 may calculate an error correction value ($\delta$=−0.03) by substituting the vehicle length (L) of the leading vehicle (LV), the vehicle distance (d) to the leading vehicle (LV), and the vehicle speed of 20 m/s into Equation 2 to calculate the error correction value ($\delta$=−0.03). The processor 140 stores the calculated error correction value ($\delta$) in the storage 130.

The processor 140 corrects second line information using the selected first line information (S370). In other words, the processor 140 generates third line information by matching the first line information with second line information. For example, when the information on the first following vehicle (FV1), which is obtained through the recognition device 120 at 1.8 seconds, is shown in FIG. 13, the processor 140 of the first following vehicle (FV1) extracts second line information, in other words, the heading angle ($\alpha_1$') and the offset ($\alpha_0$') from the information on the first following vehicle. The processor 140 generates the third line information by correcting the first line information (in other words, $\alpha_3$ and $\alpha_2$) and the second line information (in other words, $\alpha_3$' and $\alpha_2$') as illustrated in FIG. 14.

Meanwhile, when no surrounding object information is matched to the obtained surrounding object information in S350, the processor 140 selects first line information from preceding vehicle information detected using the previous error correction value ($\delta$) (S380). Thereafter, the processor 140 corrects the second line information using the first line information (S370).

Figure 15:
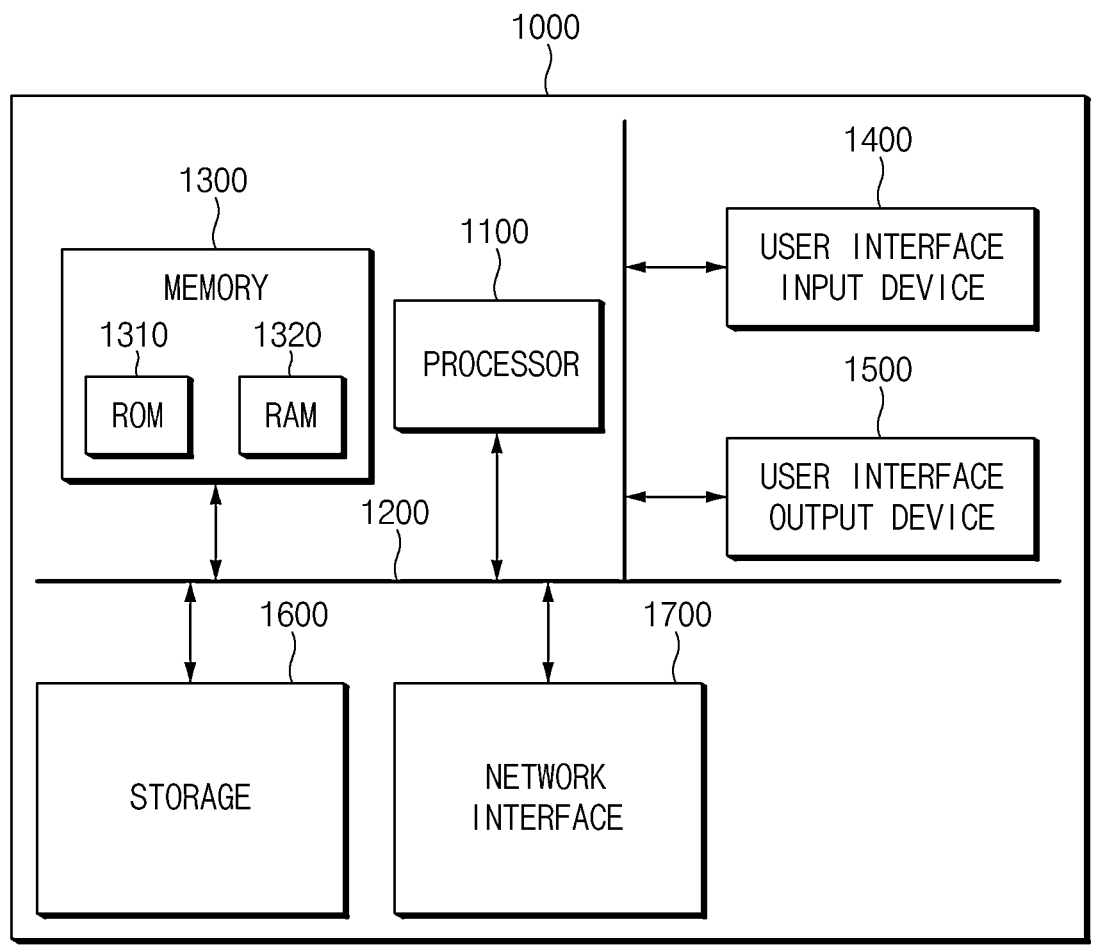
FIG. 15 is a block diagram illustrating a computing system to execute a method for planning a path, according to an embodiment of the present disclosure.

FIG. 15 is a block diagram illustrating a computing system to execute a method for planning a path, according to an embodiment of the present disclosure.

Referring to FIG. 15, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory 1310 (ROM) and a random access memory 1320 (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. In another embodiment, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims. Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

As described above, according to the present disclosure, line information recognized by the host vehicle may be corrected by utilizing the line information recognized by the leading vehicle, and the platooning path is planned using the corrected line information. Accordingly, the vehicle may maintain the lane while safely travelling.

According to the present disclosure, the error resulting from the time difference from a preceding vehicle passing through the same position may be corrected using information on the distance to the surrounding environment object, so the reliability of the line information may be improved.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. An apparatus for controlling platooning, the apparatus comprising:
 a communication device configured to receive information on a preceding vehicle from the preceding vehicle through Vehicle to Vehicle (V2V) communication;
 a recognition device configured to obtain information on an $n^{th}$ following vehicle through a sensor mounted in a vehicle body; and
 a processor configured to generate third line information by matching first line information, which is contained in the information on the preceding vehicle, to second line information, which is contained in the information on the $n^{th}$ following vehicle, and to plan a platooning path by utilizing the third line information,
 wherein the processor is configured to:
 calculate a difference between a time point at which the preceding vehicle passes through a surrounding object recognized by the sensor, and a time point at which the $n^{th}$ following vehicle passes through the surrounding object;
 select the first line information in the information on the preceding vehicle based on the calculated the difference; and
 generate the third line information by correcting the second line information using the selected first line information,
 wherein the first line information, second line information and third line information is information used to mark a lane.

2. The apparatus of claim 1, wherein the information on the preceding vehicle includes the first line information, first surrounding object information, and vehicle information, which are obtained by the preceding vehicle.

3. The apparatus of claim 2, wherein the information on the $n^{th}$ following vehicle includes the second line information, second surrounding object information, and information on a position of the preceding vehicle, which are obtained through the recognition device.

4. The apparatus of claim 3, wherein the processor is configured to:
 match the first line information to the second line information based on a coordinate system of the $n^{th}$ following vehicle.

5. The apparatus of claim 4, wherein the processor is configured to:
 correct the difference between the time point at which the preceding vehicle passes through the surrounding object, and the time point at which the $n^{th}$ following vehicle passes through the surrounding object, when the surrounding object is recognized through the recognition device.

6. The apparatus of claim 5, wherein the processor is configured to:
 calculate a maximum time error based on a vehicle length of the preceding vehicle and the information on the position of the preceding vehicle; and
 set a detection range of the information on the preceding vehicle by using the maximum time error.

7. The apparatus of claim 6, wherein the processor is configured to:
 detect the first surrounding object information, which is matched to the second surrounding object information, within the set detection range; and
 estimate a time point at which the first surrounding object information is obtained.

8. The apparatus of claim 7, wherein the processor is configured to:
 calculate an error correction value based on the vehicle length of the preceding vehicle, the information on the position of the preceding vehicle, and a vehicle speed of the preceding vehicle.

9. The apparatus of claim 7, wherein the processor is configured to:
 estimate the time point at which the preceding vehicle passes through the recognized surrounding object using an error correction value which is previously calculated, when the processor is unable to detect the first surrounding object information that corresponds to the second surrounding object information within the set detection range.

10. The apparatus of claim 9, wherein the processor is configured to:
 correct the second line information by utilizing the first line information, which is obtained at the estimated time point.

11. A method for planning a path, the method comprising:
 receiving information on a preceding vehicle from the preceding vehicle through Vehicle to Vehicle (V2V) communication;
 obtaining information on an $n^{th}$ following vehicle through a sensor mounted in a vehicle body;
 generating third line information by matching first line information, which is contained in the information on the preceding vehicle, to second line information, which is contained in the information on the $n^{th}$ following vehicle; and
 planning a platooning path by utilizing the third line information,
 wherein the generating of the third line information includes:
 calculating a difference between a time point at which the preceding vehicle passes through a surrounding object recognized by the sensor, and a time point at which the $n^{th}$ following vehicle passes through the surrounding object;
 selecting the first line information in the information on the preceding vehicle based on the calculated the difference; and
 generating the third line information by correcting the second line information using the selected first line information,
 wherein the first line information, second line information and third line information is information used to mark a lane.

12. The method of claim 11, wherein the receiving of the information on the preceding vehicle includes:
 obtaining and storing, by the preceding vehicle, the information on the preceding vehicle including the first line information and at least one of first surrounding object information or vehicle information by using at least one of a camera, a Light Detection And Ranging (Lidar), or a radar mounted in the preceding vehicle.

13. The method of claim 11, wherein the obtaining of the information on the $n^{th}$ following vehicle includes:
 obtaining and storing the information on the $n^{th}$ vehicle including the second line information and at least one of second surrounding object information, vehicle information, or information on a position of the preceding vehicle by using at least one of a camera, a Lidar, or a radar mounted in the $n^{th}$ following vehicle.

14. The method of claim 13, wherein the generating of the third line information includes:
generating the third line information by matching the first line information to the second line information based on a coordinate system of the $n^{th}$ following vehicle.

15. The method of claim 13, wherein the generating of the third line information includes:
correcting the difference between the time point at which the preceding vehicle passes through the surrounding object, and the time point at which the $n^{th}$ following vehicle passes through the surrounding object, when the surrounding object is recognized through the sensor.

16. The method of claim 15, further comprising:
calculating a maximum time error based on a vehicle length of the preceding vehicle and the information on the position of the preceding vehicle;
setting a detection range of the information on the preceding vehicle by using the maximum time error;
detecting first surrounding object information, which is matched to the second surrounding object information, within the set detection range;
selecting the first line information matched to the first surrounding object information; and
correcting the second line information by utilizing the selected first line information.

17. The method of claim 16, wherein the setting of the detection range includes:
setting the detection range by using the difference between the time points at which the preceding vehicle and the $n^{th}$ following vehicle pass through the recognized surrounding object, and the maximum time error.

18. The method of claim 16, wherein the selecting of the first line information includes:
estimating a time point at which the first surrounding object information is obtained; and
selecting line information at the estimated time point as the first line information.

19. The method of claim 18, wherein the selecting of the first line information includes:
calculating an error correction value based on the vehicle length of the preceding vehicle, the information on the position of the preceding vehicle, and a vehicle speed of the preceding vehicle.

20. The method of claim 16, further comprising:
estimating a time point at which the preceding vehicle passes through the recognized surrounding object using an error correction value which is previously calculated, when unable to detect the first surrounding object information that corresponds to the second surrounding object information within the detection range; and
selecting line information obtained at the estimated time point as the first line information.

* * * * *